United States Patent
Kraus

(10) Patent No.: US 6,254,302 B1
(45) Date of Patent: Jul. 3, 2001

(54) CONNECTOR WITH INTERMATEABLE HOLDING ELEMENT AND PLATE MEMBER INCLUDING ELASTIC HOLDING ELEMENT MOUNTING REGION

(75) Inventor: Willibald Kraus, Grünstadt (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/256,803

(22) Filed: Feb. 24, 1999

(30) Foreign Application Priority Data

Feb. 25, 1998 (DE) .............................. 198 07 953

(51) Int. Cl.[7] .............................. B25G 3/18; F16B 21/07
(52) U.S. Cl. .................... 403/326; 403/254; 403/316; 403/DIG. 14; 403/328; 403/329; 403/386; 248/221.12
(58) Field of Search .................... 403/326, 353, 403/327, 331; 24/667; 248/221.12; 72/379.2

(56) References Cited

U.S. PATENT DOCUMENTS

| | | | |
|---|---|---|---|
| 2,193,802 | * 3/1940 | Chambless et al. .................... 24/667 |
| 4,470,716 | * 9/1984 | Welch .................................. 403/254 |
| 4,861,208 | * 8/1989 | Boundy ............................... 411/339 |
| 5,026,016 | * 6/1991 | Lisowski .............................. 248/314 |
| 5,051,021 | * 9/1991 | Pelz ..................................... 403/353 |
| 5,106,223 | * 4/1992 | Kraus . | |
| 5,507,610 | 4/1996 | Benedetti et al. . | |
| 5,529,271 | * 6/1996 | Dunchock .......................... 248/205.2 |
| 5,651,634 | * 7/1997 | Kraus ................................ 403/331 X |
| 5,738,462 | * 4/1998 | Petersen et al. ..................... 403/353 |
| 5,850,954 | * 12/1998 | Dong-Joo ............................ 224/197 |
| 5,957,421 | * 9/1999 | Barbour ........................... 248/220.21 |
| 5,975,820 | * 11/1999 | Kirchen ............................... 411/339 |

FOREIGN PATENT DOCUMENTS

| | | |
|---|---|---|
| 3324310 | * 1/1985 | (DE) . |
| 39 21 362 A1 | 1/1991 | (DE) . |
| 40 14 589 C1 | 8/1991 | (DE) . |
| 0 432 855 B1 | 3/1994 | (EP) . |
| 0 648 944 A1 | 4/1995 | (EP) . |
| 0 726 401 B1 | 3/1998 | (EP) . |

* cited by examiner

Primary Examiner—Lynne H. Browne
Assistant Examiner—Ernesto Garcia
(74) Attorney, Agent, or Firm—Fay, Sharpe, Fagan, Minnich & McKee, LLP

(57) ABSTRACT

A connector is provided for use in selectively connecting an associated plate member to an associated support member. The connector includes a first connector member (1) including a first base portion (10) adapted for connection to the associated plate member. An elongate holding element (4) is adapted for connection to the associated support member and also for selective connection to the first connector member (1). An elastic region (11) is arranged on the first connector member (1) to engage a first free end of the elongate holding element when the first connector member and the holding element are disposed in an intermated rest position. In one form, the elastic region includes a holding zone (15) adapted to surround the free end (20) of the elongate holding member. The holding zone is supported relative to the first base portion by a set of spiral arms that extend radially outwardly from the holding zone. In another form, the elastic region is formed by a pair of elongate resilient arms that are disposed on opposite sides of the elastic region. The arms are biased together and are adapted to receive the free end of the holding element when the connector member and holding element are in their intermated positions.

21 Claims, 2 Drawing Sheets

CONNECTOR WITH INTERMATEABLE HOLDING ELEMENT AND PLATE MEMBER INCLUDING ELASTIC HOLDING ELEMENT MOUNTING REGION

BACKGROUND OF THE INVENTION

The subject invention is directed to the connector art and, more particularly, to a connector system that finds particular application in automobiles to provide a connection between a support member such as a car body part of a motor vehicle and a plate element such as interior trim covering components. The connector includes a substantially rectangular plate member having at least one pocket including an insertion slot that is adapted to receive a flange mounted on the end of an associated elongate holding element. The plate member and holding element are brought together into their intermated position by moving the components together in a direction transverse to the longitudinal direction or axis of the holding element, so that the flange and end of the holding element are received in the pocket of the plate member.

Connectors of the type under consideration are commonly used in the art to connect interior trim and other items to car body parts of motor vehicles. As an example, a connector is described in EP 0 726 401 A1 including an upper part or member having two parallel extending pockets adapted to receive a pair of holding element flanges positioned an axial distance from each other on an elongate holding element. In that connector, the upper flange of the pair of flanges carried on the elongate holding element has an elastic middle region which is equipped with a set of spirally wound radially extending arms.

The connector described above provides good tolerance compensation that is useful in the automotive sector for attaching, as an example, door coverings on the inside of automotive vehicles which are exposed to a range of temperature stresses and the like. However, in known connector constructions of the type described above, one drawback is the physical size of the overall connector that is required. The excessive size is due mainly to the pair of parallel extending pockets which are adapted to receive the two flanges. The relatively large construction of connectors of this type often make them limited in application.

Another connector known in the art enables auxiliary components to be fastened relative to a work piece. Such a connector is described in EP 0 432 855 A1. As described there, a substantially flat work piece is provided with a punched-in or pocket-like bulged-out surface adapted to receive a second component. Typically, the second component is inserted into the flat work piece.

One disadvantage of connectors of this type is that the holding effect or efficiency is relatively low and thus, the second component can sometimes be easily removed from the flat work piece. Moreover, connectors of the type described immediately above provide no tolerance compensation.

In contrast to the above, it is an object of the present invention to provide an inexpensive connector system or assembly, while retaining excellent installation possibility and extremely good tolerance compensation, results in a significant reduction in the overall height of the entire connection.

SUMMARY OF THE INVENTION

This object is achieved according to the invention in that a first connector member is formed as a substantially rectangular plate member and has a holding zone and a single pocket that are adapted to each respectively receive the free end of an elongate holding element and a flange carried on the holding element, respectively. The holding zone is elastically constructed and preferably includes a set of spiral radially extending arms that support a ring shaped holding zone member relative to the substantially rectangular plate member. The ring-shaped holding zone member firmly surrounds and selectively connects with the free end of the holding element.

It is an advantage of the present invention that tolerance compensation is effected by the bottom surface of the rectangular plate member via the elastic holding zone disposed in the center of the rectangular plate member rather than via the flange member of the holding element as has been the practice heretofore. As a result, a significant reduction in the overall height of the connector construction is realized according to the present invention while retaining all of the benefits of know prior constructions.

In accordance with the first preferred embodiment of the invention, an elastic middle region is provided in the substantially rectangular plate member. The middle region includes a holding zone adapted to receive the front lead end of the holding element. The holding zone is connected with the back flat surface of the rectangular plate member using a set of spiral radially extending flexible arm members.

In a further embodiment of the invention, the elastic middle region of the rectangular plate member is formed in the shape of a fork and includes at least a pair of resilient opposing elastic arms with free ends that form mirror images of each other. The supported ends of the elastic arms are connected to the back flat surface of the rectangular plate member. Further, the pair of elastic arms are equipped with a conically tapering insertion region and a bulged area which is adapted to engage the free end of the elongate holding element. Thus, the conically tapering insertion region of the pair of elastic arms assist in guiding the free end of the elongate holding element into its final intermated rest position whereat the free end is held snugly in place by the bulged region of the elastic arms.

It is an advantage of the present invention that the back flat surface of the rectangular plate member can be shaped in round, oval, or rectangular patterns or configurations and can be provided with a central elastic region adapted to receive the free end of the elongate holding element. Further, in accordance with the present invention, it is also possible to arrange the elastic region in a laterally offset position relative to the center of the substantially rectangular plate member so that the overall construction is asymmetric.

In accordance with a further aspect of the invention, a recess is defined in the rear flat surface of the substantially rectangular plate member to assist in guiding the free end of the elongate holding element into its intermated rest position relative to the plate member. An insertion slot is formed as an entranceway into the elastic region. In addition, a sloped insertion latch member is disposed adjacent the insertion slot for latching the free end of the elongate holding element in its intermated rest position relative to the plate member. The insertion latch member has a sloped surface that terminates on one end at substantially the height of the insertion slot defined in the rectangular plate member. The recess and insertion slot together with the latch member enable the upper flange of the free end of the elongate holding element to be inserted easily and simply into the single pocket defined in the rectangular plate member.

In accordance with a still further aspect of the invention, the width of the elongate recess defined in the rectangular plate member substantially corresponds to the width or the diameter of the free end of the elongate holding element to enable the holding element to be guided along the recess. To that end, the free end of the holding element can be formed in a variety of shapes and configurations such as, for example, as a simple cylinder, as a spherical or conical segment, or in a rectangular shaped cross section. Other shapes and patterns are possible as well. It is contemplated that certain shapes such as, for example, a rectangular cross section form provides, in particular, protection of the elongate holding element against twisting relative to the rectangular plate member.

In accordance with still yet a more limited aspect of the invention, in order to facilitate the relative movement between the elongate holding element and plate member towards their intermated rest position, the insertion slot is defined on opposite sides by an arched insertion region formed as a tapered opening for guiding a central peg portion of the holding element relative to the resilient flexible region of the rectangular plate member. Preferably, the tapered insertion opening is defined on the open end of the pocket member. The tapered opening is held apart in a spaced apart relationship relative to the rectangular plate member at a distance large enough to accommodate the flange member held on the free end of the elongate holding element.

It is a primary advantage of the invention that greater tolerance compensations are enabled due to the novel construction of the subject connector system.

It is another advantage of the invention that a connector system is provided having a low overall height.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figures 5, 6:
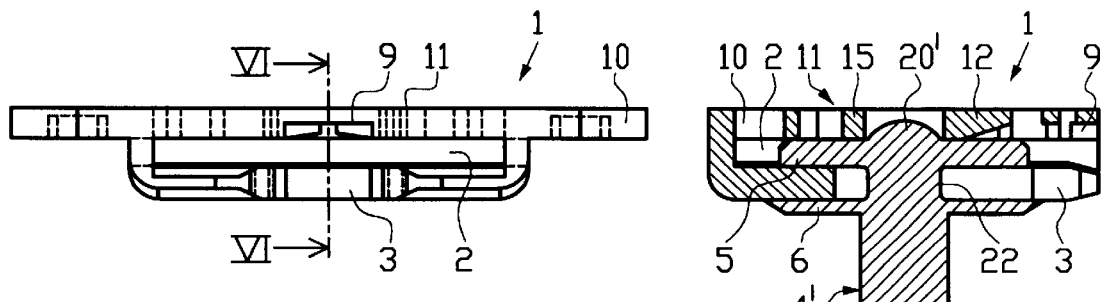
FIG. 5 is a front elevational view of the rectangular plate member shown in FIGS. 1 and 2.
FIG. 6 is a cross-sectional view taken on line VI—VI of FIG. 5 and including the elongate holding element shown in FIG. 4 received in the rectangular plate member of FIG. 5.

Referring now to the drawings wherein the showings are for the purposes of illustrating the preferred embodiments of the invention only and not for purposes of limiting same, the overall arrangement of the connector system formed in accordance with the present invention is shown and includes a substantially rectangular plate member 1 that is adapted to receive an elongate holding element 4, 4' in an intermated rest position shown best in FIG. 6. In general, the rectangular plate member 1 defines an elastic middle region or zone 11, 11' that is positioned and formed to engage the free end 20, 20' of the elongate holding element 4, 4' while a pocket 2 on the plate member surroundingly engages a flange 5 on the holding element. The elastic middle region or zone 11, 11' provided in the subject connector results in extremely good tolerance compensation while simultaneously resulting in a significant reduction in the overall height of the entire connection system.

Figure 1:
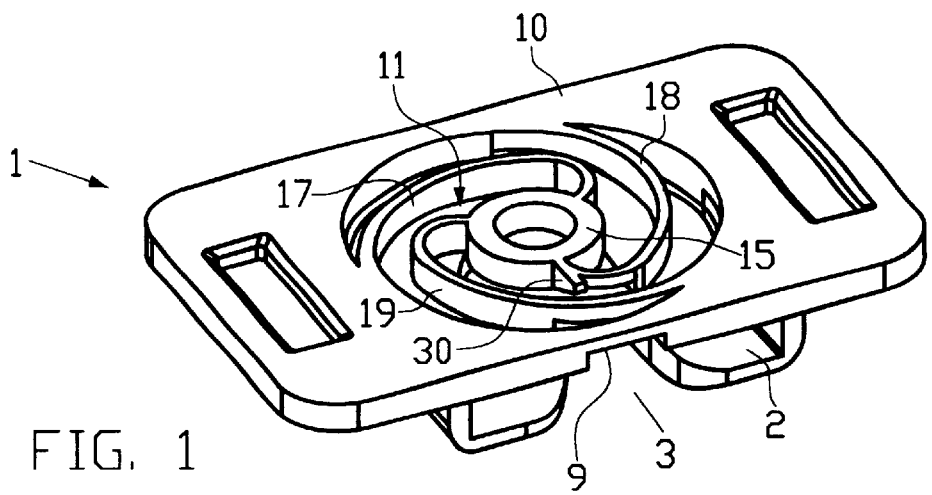
FIG. 1 is a top isometric perspective view showing the overall arrangement of the rectangular plate member component of the connector system formed in accordance with a first preferred embodiment of the invention.
Figure 2:
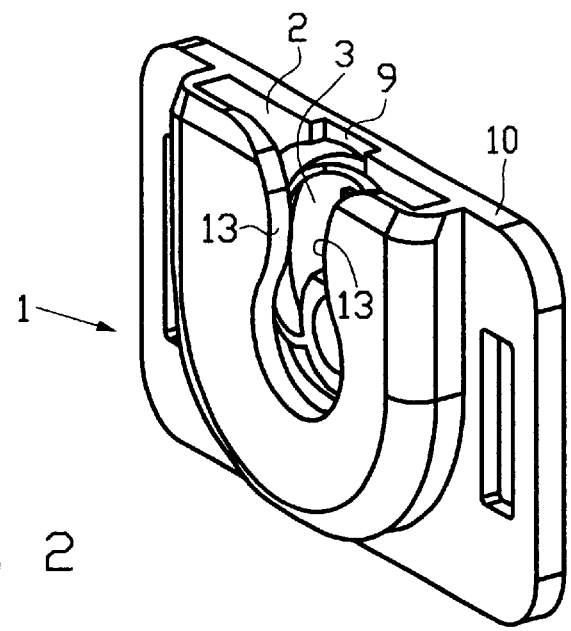
FIG. 2 is a bottom isometric perspective view of the rectangular plate member shown in FIG. 1.

Turning first to FIGS. 1 and 2, a substantially rectangular plate member 1 formed in accordance with a first preferred embodiment is shown in top and bottom isometric perspective views, respectively. Preferably, the plate member 1 is formed of plastic and has a substantially planar back surface 10. The flat deck structure of the plate member finds particular application in automotive use such as to provide a connection between a component of a motor vehicle body and an interior trim item so that the trim item is held in position relative to the motor vehicle body.

With continued reference to FIGS. 1 and 2 and with additional reference to FIG. 5, the rectangular plate member 1 includes a single pocket 2 provided with an insertion slot area 3. The pocket 2 is defined in part by the bottom surface 10 of the rectangular plate member as shown in the figures. The elastic middle region or zone 11 and the pocket member 2 are positioned relative to each other to enable the free end 20, 20' of the holding element 4, 4' to be received centrally within the elastic middle region 11 while the holding element 4, 4' is disposed in the pocket 2. More particularly, the elongate holding element 4, 4' includes a pair of axially spaced apart flange members 5, 6 adjacent the free end 4, 4' thereof. The flange members 5, 6 are held in a spaced apart relationship and are separated by a connection peg member 22 as shown best in FIGS. 3 and 4.

In accordance with the present invention, the pocket 2 defined on the bottom surface 10 of the rectangular plate member 1 is adapted to receive the outer flange member 5 therein as shown in FIG. 6 and, as such, has a curved portion shaped to correspond to the configuration of the outer flange member 5. In the position shown in FIG. 6, the elongate holding element 4' is held in place securely by the interaction of the other flange member 5 with the pocket 2 and, further, by the interaction of the free end 20' of the holding element 4' received in a holding zone 15 of the elastic middle region or zone 11, the details of which will be described below.

Figure 7:
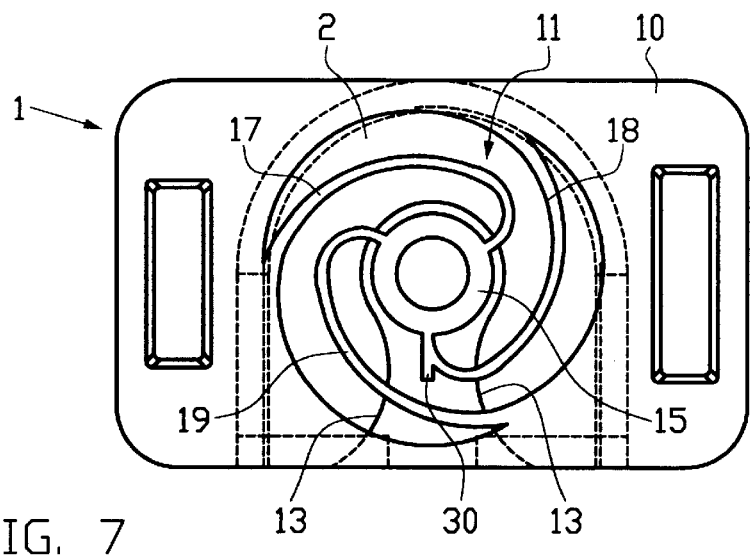
FIG. 7 is a top plan view of the rectangular plate member shown in FIGS. 1 and 2; and, FIG. 8 is a top plan view of a rectangular plate member component of the subject connector system formed in accordance with a second preferred embodiment.

In accordance with the first preferred embodiment of the invention, the elastic middle region or zone 11 of the rectangular plate member 1 is provided with a ring-shaped holding zone or region 15 which is adapted to selectively embeddingly receive the lead end 20, 20' of the elongate holding element 4, 4'. Preferably, the ring-shaped holding zone 15 is connected to the rectangular plate member using a set of spiral radially extending arm members 17, 18, and 19 as shown best in FIGS. 1 and 7. As shown in FIG. 7, the radially extending arms 17, 18, and 19 are fashioned as to appear wound around the holding zone 15 of the elongate holding element. This shape enables a large degree of flexibility and installation tolerance compensation.

As shown best in FIGS. 1 and 2, the bottom surface 10 of the rectangular plate member 1 is provided with a recess 9 located at the open end of the single pocket member 2. The recess 9 is provided to enable the free end 20, 20' of the holding element 4, 4' to pass freely into the elastic middle region or zone 11, 11'. To further facilitate the relative motion and connection between the holding element and the plate member, an insertion slot 3 is defined between opposing ears 13 of the single pocket member 2. Preferably, as shown in the drawings, the ears 13 are formed as arched or tapered insertion openings so that the holding element and plate member can be smoothly and easily brought into their intermated connected position.

To still further facilitate the connection between the holding element and the plate member, an insertion slope surface 12 is formed on the bottom side of a guidance strip 30 carried on the ring-shaped holding zone 15. The sloped insertion surface is adapted to engage the free end 20, 20' of the holding element 4, 4' as the plate member and holding element are brought together in the direction shown by the arrow in FIG. 6. In the position shown in that Figure, the sloped insertion surface and the guidance strip act as an insertion latch member for locking the holding element in place relative to the plate member by engaging the free end 20, 20' of the holding element and preventing it from moving from the position shown.

Figure 3:
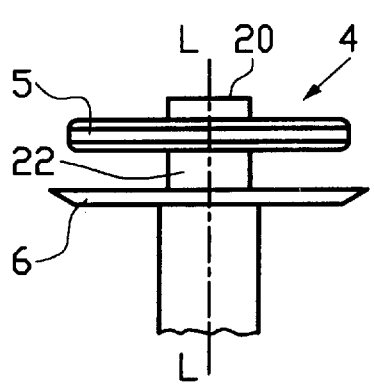
FIG. 3 is a front elevational view of the elongate holding element component of the subject connector system formed in accordance with a first preferred embodiment.
Figure 4:
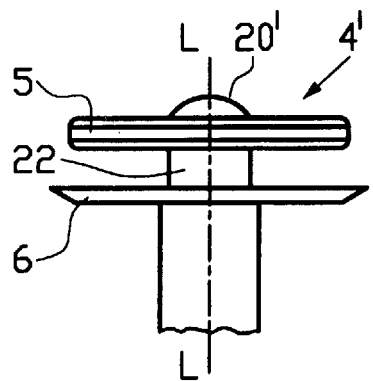
FIG. 4 is a front elevational view of the elongate holding element component of the subject connector system formed in accordance with a second preferred embodiment.

In accordance with one preferred embodiment of the invention, the width and profile of the recess 9 is adapted to correspond to the outer width or diameter and profile of the lead end 20, 20' of the holding element 4, 4' shown in FIGS. 3 and 4.

In the first preferred embodiment shown in FIGS. 1–7, a guidance strip 30 is provided as described above oriented toward the insertion slot 3 formed between the tapered insertion openings 13 of the pocket 2. The guidance strip 30 is preferably carried on the ring-shaped holding zone 15 which is connected to the rectangular plate member 1 through the spirally wound arm members 17–19. The guidance strip 30, in cooperation with the recess 9 and the arched or tapered insertion opening in the preferred form of opposing 13 of the plate member 1, provide excellent mechanical guidance as the upper flange 5 of the holding element 4, 4' is inserted into the pocket 2 of the rectangular plate member 1.

Although it is apparent that the holding element can have wide range of constructions beyond the portion thereof shown in the figures, it is important in accordance with the present invention to provide a connection peg portion 22 between the pair of parallel spaced apart flange members 5 and 6 so that the flange 5 can be inserted into the pocket 2 by relative motion between the plate member and the holding element in a direction transverse to the longitudinal axis L of the holding element. The space between the pair of spaced apart parallel flange members 5 and 6 is occupied by the portion of the pocket member 2 spaced apart from the plate member 1. In accordance with the present invention, the lower flange member 6 is disposed on the holding element in a position relative to the upper flange member 5 to engage an exterior surface of the pocket and thereby provide dampening between the holding element and the plate member and thus prevent possible unwanted rattling noises in the connector system when the plate member and holding element are disposed in their intermated rest position shown best in FIG. 6.

In one preferred embodiment of the holding element 4, a blunt cylindrical free end portion 20 is provided as a truncated cylinder above the upper flange member 5 as best shown in FIG. 3. In an alternative preferred embodiment shown in FIG. 4, the holding element 4' includes a spherical segment 20' located adjacent the upper flange member 5. In either case, the width and profile of the recess 9 defined in the rectangular plate member 1 is adapted to correspond to the width or diameter and profile of the free end 20 or 20' of the holding element 4 or 4', respectively. Accordingly, the recess 9 is formed to have a flat surface adapted for engagement with the blunt cylindrical end 20 of the first holding element 4 and, alternatively, as a curved shaped recess 9 adapted to correspond to the spherical segment 20' on the free end of the second holding element 4'.

As best shown in FIG. 6, the recess is disposed adjacent the insertion slope surface 12. In that way, the cylindrical end 20 or the spherical segment 20' encounters first the recess 9 and then the insertion slope surface 12 as the holding element 4 or 4' transits toward the elastic middle region 11 of the rectangular plate member 1. Thus, it is possible in a simple manner, to insert the holding element into the rectangular plate member along the direction labeled by an arrow in FIG. 6 along the insertion slot 3 through the tapered insertion region 13 in such a manner that the upper flange 5 embeds itself within the pocket 2.

When the holding element and plate member are in their intermated position represented in FIG. 6, the spherical segment 20' is received in the ring-shaped holding zone 15 of the middle region 11, so that the holding element 4 or 4' is embedded in a mounted position and is functionally secured within the upper rectangular plate member 1. In the position shown, when the free end 20 or 20' of the holding element 4 or 4' is selectively held within the holding zone 15, which is in turn connected via the spirally wound arms 17–19 with the bottom surface of the upper rectangular plate member 1, the holding element is able to occupy, in different planes, an offset position relative to the rectangular plate member when normal tolerances are surpassed thus affording an overall desirable tolerance compensation effect.

In addition to the benefits described above, another advantageous result is an extremely low overall shape of the rectangular plate member 1. The low profile is enabled because only a single pocket 2 is used in the subject connector, unlike the connector system described above by way of background. In addition, dampening is provided and thus unwelcome rattling noises and wear on the connector are avoided in the connector system since the lower flange member 6 is formed elastically and acts upon the outer surface of the pocket 2.

Figure 8:
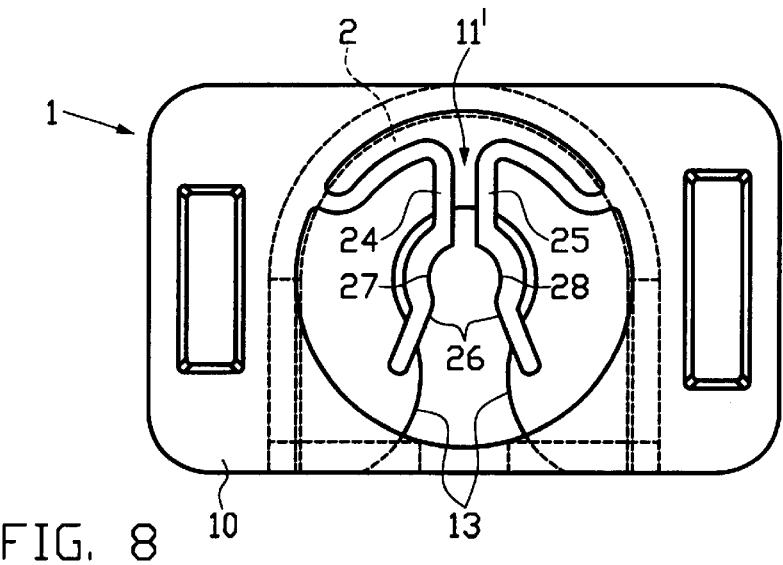

Turning now to FIG. 8, a second preferred embodiment of the rectangular plate member 1 is shown. Overall, the elastic middle region 11 is formed in the shape generally of a fork and has a pair of mirror image shaped elastic arms 24 and 25 extending from the bottom surface 10 of the rectangular plate member as shown. The pair of elastic arms 24 and 25 each have a conically tapering insertion region 26 and a bulge region 27 and 28 adapted to envelope, in a mounted position, at least partially, the front end 20 or 20' of the holding elements 4 or 4' described above. The bulge regions 27 and 28 each function analogously to the ring-shaped holding zone 15 of the first embodiment of the rectangular plate member shown in FIGS. 1, 2, 5, and 7 and described above.

It is to be noted that in the second embodiment of the second rectangular plate member shown in FIG. 8, the insertion slot 3 has an arched insertion zone 13 that is tapered to receive the connection peg portion 22 between the pair of flange members 5 and 6 of the holding elements 4 or 4'.

As a direct result of the novel features of the present invention including a rectangular plate member provided with a single pocket 2 and an elastic middle region or zone 11, 11' that is adapted to act in cooperation with a holding element 4, 4' having a pair of spaced apart flange members 5 and 6, a highly desirable tolerance compensation affect in different planes is realized in a connector system having an extremely low overall height of the entire assembled unit.

Although the holding element has been described above in connection with a substantially cylindrical elongate construction, a hollow shaft can be used as well as a shaft with locking elements. However, the pair of spaced apart parallel flange members 5 and 6 are required so that the holding element can be held securely in place within the pocket 2 of the plate member and so that dampening is provided by contact of the lower flange member 6 with the pocket 2.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A connector for use in selectively connecting an associated plate element to an associated support member, the connector comprising:

a first connector member including a first base portion adapted for connection to the associated plate element, the first connector member forming a pocket having an opening defining an insertion slot leading into the pocket;

an elongate holding element adapted for connection to the associated support member, the elongate holding element defining a longitudinal axis and terminating in a first free end, the holding element carrying a first flange member adjacent the first free end of the elongate holding element, the first flange member being selectively received in said pocket when the first connector member and the holding element are brought together in an intermated rest position by relative movement between the first member and the holding element in a direction transverse to said longitudinal axis; and, an elastic region arranged on the first connector member, the elastic region including a holding zone adapted to engage the first free end of the holding element when the first connector member and the holding element are disposed in said intermated rest position, the holding zone being connected to said first base portion by at least two resilient arm members.

2. A connector for use in selectively connecting an associated plate element to an associated support member, the connector comprising:

a first connector member including a first base portion adapted for connection to the associated plate element, the first connector member forming a pocket having an opening defining an insertion slot leading into the pocket;

an elongate holding element adapted for connection to the associated support member, the elongate holding element defining a longitudinal axis and terminating in a first free end, the holding element carrying a first flange member adjacent the first free end of the elongate holding element, the first flange member being selectively received in said pocket when the first connector member and the holding element are brought together in an intermated rest position by relative movement between the first member and the holding element in a direction transverse to said longitudinal axis; and, an elastic region arranged on the first connector member to engage the first free end of the holding element when the first connector member and the holding element are disposed in said intermated rest position, the elastic region including a holding zone adapted to surround the first free end of the elongate holding member when the first connector member and the holding element are disposed in said intermated rest position, the holding zone being connected to said first base portion by a set of spiral arm members extending radially outwardly from the holding zone.

3. The connector according to claim 2 wherein:

the holding zone is substantially ring shaped; and, the first free end of the elongate holding member engages with the ring shaped holding zone when the first connector member and the holding element are disposed in said intermated rest position.

4. The connector according to claim 3 wherein said first base portion defines i) a recess disposed adjacent said insertion slot for guiding the first free end of the holding element toward said holding zone during relative movement between the first member and the holding element towards said intermated rest position, and ii) a sloped insertion surface adjacent said elastic region to guide the first free end of the holding element over and then into said ring shaped holding zone.

5. The connector according to claim 4 wherein at least one spiral arm member of said set of spiral arm members carries a guidance strip member defining said sloped insertion surface, the guidance strip member being oriented on the at least one of said set of spiral arm members across from said insertion slot to guide the first free end of the holding element towards said ring shaped holding zone.

6. The connector according to claim 5 wherein the recess has a width and a profile adapted to correspond to a width and a profile of said first free end of the holding element.

7. The connector according to claim 6 wherein the first free end of the elongate holding element is shaped to have a one of a cylindrical profile, a spherical profile, a conical profile, and a rectangular profile.

8. The connector according to claim 7 further including a second flange member on the elongate holding member, the second flange member contacting an exterior surface of said pocket and providing a sealing effect therebetween when the first connector member and the holding element are disposed in said intermated rest position.

9. The connector according to claim 8 wherein:

the elongate holding member defines a connection peg between said first and second flange members; and, said insertion slot is formed between an opposing set of tapered insertion openings defined by said pocket.

10. The connector according to claim 1 wherein said elastic region includes a pair of elastic arm members connected to said first base portion of the first connector member, the pair of elastic arm members being substantially mirror images of each other.

11. The connector according to claim 10 wherein each of the pair of elastic arm members includes a conically tapering insertion zone and a bulged area adapted to releasably engage said first free end of the elongate holding element.

12. The connector according to claim 1 wherein:

said first base portion is formed in a one of a round shape, an oval shape, and a rectangular shape; and, said elastic region is centrally located on said first base portion.

13. The connector according to claim 1 wherein:

the holding zone is substantially ring shaped; and, the first free end of the elongate holding member is adapted for embedded engagement with the ring shaped holding zone when the first connector member and the holding element are disposed in said intermated rest position.

14. The connector according to claim 1 wherein said first base portion defines i) a recess for guiding the first free end of the holding element toward said holding zone during relative movement between the first member and the holding element towards said intermated rest position, and ii) a sloped insertion surface to guide the first free end of the holding element over and then into said circularly shaped holding zone.

15. The connector according to claim 14 wherein the recess has a width and a profile adapted to correspond to a width and a profile of said first free end of the holding element.

16. The connector according to claim 1 wherein the first free end of the elongate holding element is shaped to have a one of a cylindrical profile, a spherical profile, a conical profile, and a rectangular profile.

17. The connector according to claim 1 further including a second flange member on the elongate holding member, the second flange member being contacting an exterior surface of said pocket and providing a sealing effect therebetween when the first connector member and the holding element are disposed in said intermated rest position.

18. The connector according to claim 1 wherein said insertion slot is formed between an opposing set of tapered insertion openings defined by said pocket.

19. A connector comprising:

a first connector member including a pocket having an opening defining an insertion slot leading into the pocket;

an elongate holding element defining a longitudinal axis and terminating in a first free end, the holding element carrying a flange member adjacent the first free end, the flange member being selectively received in said pocket when the first connector member and the holding element are brought together in an intermated rest position by relative movement between the first member and the holding element in a direction transverse to said longitudinal axis; and, a region arranged on the first connector member engaging the first free end of the holding element when the first connector member and the holding element are disposed in said intermated rest position, the region including a holding zone surrounding the first free end of the elongate holding member when the first connector member and the holding element are disposed in said intermated rest position, the holding zone being connected to said first connector member by a set of arm members extending between the holding zone and the first base portion.

20. The connector according to claim 19 wherein:

the holding zone is substantially ring shaped; and, the first free end of the elongate holding member is adapted for embedded engagement with the ring shaped holding zone when the first connector member and the holding element are disposed in said intermated rest position.

21. The connector according to claim 19 wherein said first connector member defines i) a recess disposed adjacent said insertion slot for guiding the first free end of the holding element toward said holding zone during relative movement between the first member and the holding element towards said intermated rest position, and ii) a sloped insertion surface adjacent said region to guide the first free end of the holding element over and then into said ring shaped holding zone.

* * * * *